US011887628B2

(12) United States Patent
Zheng et al.

(10) Patent No.: US 11,887,628 B2
(45) Date of Patent: Jan. 30, 2024

(54) VIDEO PROCESSING METHOD AND APPARATUS, DEVICE, AND STORAGE MEDIUM

(71) Applicant: Beijing Bytedance Network Technology Co., Ltd., Beijing (CN)

(72) Inventors: Qifan Zheng, Beijing (CN); Chen Zhao, Beijing (CN); Yan Zeng, Beijing (CN); Pingfei Fu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/085,393

(22) Filed: Dec. 20, 2022

(65) Prior Publication Data

US 2023/0122589 A1 Apr. 20, 2023

Related U.S. Application Data

(63) Continuation of application No. PCT/CN2021/107664, filed on Jul. 21, 2021.

(30) Foreign Application Priority Data

Jul. 23, 2020 (CN) .......................... 202010718056.6

(51) Int. Cl.
*G11B 27/031* (2006.01)
*G06F 3/0486* (2013.01)
*H04N 5/272* (2006.01)

(52) U.S. Cl.
CPC .......... *G11B 27/031* (2013.01); *G06F 3/0486* (2013.01); *H04N 5/272* (2013.01)

(58) Field of Classification Search
CPC ...... G11B 27/031; G06F 3/0486; H04N 5/272
See application file for complete search history.

(56) References Cited

U.S. PATENT DOCUMENTS

| 5,781,188 A | 7/1998 | Amiot et al. |
| 9,250,796 B2 | 2/2016 | Yahyavi |

(Continued)

FOREIGN PATENT DOCUMENTS

| CN | 1875624 A | 12/2006 |
| CN | 106657810 A | 5/2017 |

(Continued)

OTHER PUBLICATIONS

Wang, "User Guide for Apowersoft, the Best Video Editor", Starlight Blinking Library, Feb. 1, 2019, ("Introduction of the Special Functions"—"Save & Export"), http://www.360doc.com/content/19/0201/05/9824753_812470494, 67 pages.

(Continued)

*Primary Examiner* — Mishawn N. Hunter
(74) *Attorney, Agent, or Firm* — ARENTFOX SCHIFF LLP

(57) ABSTRACT

The present disclosure provides a video processing method, an apparatus, a device and a storage medium. The method includes: after determining a target effect style and determining a target video clip based on presentation of a video to be processed on a timeline, establishing a binding relationship between the target effect style and the target video clip in response to an effect application trigger operation, so as to achieve an effect of applying the target effect style to the target video clip. The embodiment of the present disclosure, by establishing the binding relationship between the target effect style and the target video clip, achieves the effect of effect processing only on a certain video clip of the video, thereby meeting the user's demand of effect processing only on a certain video clip, which increases flexibility of video effect processing, and further improves the user's experience of video effect processing.

14 Claims, 7 Drawing Sheets

(56) References Cited

U.S. PATENT DOCUMENTS

| | | |
|---|---|---|
| 2012/0210230 A1 | 8/2012 | Matsuda et al. |
| 2013/0104042 A1 | 4/2013 | Meaney et al. |
| 2013/0121668 A1 | 5/2013 | Meaney et al. |
| 2015/0281591 A1 | 10/2015 | Yahyavi |
| 2016/0336042 A1 | 11/2016 | Huang et al. |
| 2017/0256288 A1* | 9/2017 | Ai .................. H04N 5/2628 |

FOREIGN PATENT DOCUMENTS

| | | |
|---|---|---|
| CN | 107124624 A | 9/2017 |
| CN | 109040615 A | 12/2018 |
| CN | 109346111 A | 2/2019 |
| CN | 109525901 A | 3/2019 |
| CN | 110198486 A | 9/2019 |
| CN | 110383820 A | 10/2019 |
| CN | 110674341 A | 1/2020 |
| CN | 110691276 A | 1/2020 |
| CN | 111050203 A | 4/2020 |
| CN | 111757013 A | 10/2020 |
| JP | 2005278212 A | 10/2005 |
| JP | 2015504629 A | 2/2015 |
| JP | 2019096950 A | 6/2019 |
| KR | 19990067919 A | 8/1999 |
| KR | 20060090239 A | 8/2006 |
| KR | 20080056722 A | 6/2008 |
| KR | 10-2010-0086136 A | 7/2010 |
| KR | 20170092260 A | 8/2017 |
| WO | 0028543 A1 | 5/2000 |
| WO | 2019230225 A1 | 12/2019 |

OTHER PUBLICATIONS

International Search Report and Written Opinion in PCT/CN2021/107664, dated Oct. 12, 2021, 11 pages.

"Adding multi-segment filter to mobile upload video in Bilibili", https://jingyan.baidu.com/article/f0062228f34087bad3f0c8c3, Mar. 2020, 6 pages.

"Introduction to common video editing software", Science & Technology Information, 2013, No. 34, 6 pages.

Office Action in IN202327003200, dated Jun. 27, 2023, 5 pages.

Notice of Allowance in KR1020237002183, dated Jul. 14, 2023, 3 pages.

Extended European Search Report dated Nov. 6, 2023, in EP21845735.6, 8 pages.

* cited by examiner

VIDEO PROCESSING METHOD AND APPARATUS, DEVICE, AND STORAGE MEDIUM

The present application is a continuation of International Patent Application No. PCT/CN2021/107664, filed on Jul. 21, 2021, which claims priority of Chinese Patent Application No. 202010718056.6, filed on Jul. 23, 2020, and the entire content disclosed by the Chinese patent application is incorporated herein by reference as part of the present application.

TECHNICAL FIELD

The present disclosure relates to a field of data processing, and more particularly, to a video processing method, an apparatus, a device and a storage medium.

BACKGROUND

At present, when effect processing is performed on a video, it usually takes effect on all pictures of the video. For example, when a filter effect is added to a video, the added filter needs to be applied to all pictures of the video, so as to achieve an effect of adding a filter to the whole video.

In practical application, users may have various demands for video effect processing; however, if with respect to various demands, various effects are still rigidly applied to all pictures of the whole video, users' experience of video effect processing will be reduced.

To this end, how to perform video effect processing more flexibly, so as to improve users' experience of video effect processing, is a technical problem that needs to be solved urgently at present.

SUMMARY

In order to solve the above-described technical problems or at least partially solve the above-described technical problems, the present disclosure provides a video processing method, an apparatus, a device, and a storage medium, which can perform effect processing only on a certain video clip of a video, thereby improving flexibility of video effect processing, and further improving users' experience of video effect processing.

The present disclosure provides a video processing method, the method includes:
  determining a target effect style;
  determining, based on presentation of a video to be processed on a timeline, a target video clip in the video to be processed;
  establishing, in response to an effect application trigger operation, a binding relationship between the target effect style and the target video clip;
  based on the binding relationship, presenting the target video clip to which the target effect style is applied.

In an optional embodiment, after the establishing, in response to an effect application trigger operation, a binding relationship between the target effect style and the target video clip, the method further includes:
  generating an effect track for the target video clip, and establishing a binding relationship between the effect track and the target video clip, wherein a length of the effect track is used to represent a length of the target video clip to which the target effect style is applied;
  updating, in response to a length adjustment operation with respect to the effect track, the length of the target video clip having the binding relationship with the effect track.

In an optional embodiment, the method further includes:
  in a case where a drag displacement with respect to the effect track reaches a preset threshold, releasing the binding relationship between the effect track and the target video clip, and releasing the binding relationship between the target video clip and the target effect style.

In an optional embodiment, the method further includes:
  controlling, in response to a move operation with respect to the target video clip, the effect track having the binding relationship with the target video clip and the target effect style having the binding relationship with the target video clip to move with the target video clip.

In an optional embodiment, the target video clip is located on a main track or a picture-in-picture track of the video to be processed.

In a second aspect, the present disclosure further includes a video processing apparatus, the apparatus includes:
  a first determining module, configured to determine a target effect style;
  a second determining module, configured to determine, based on presentation of a video to be processed on a timeline, a target video clip in the video to be processed;
  a first establishing module, configured to establish, in response to an effect application trigger operation, a binding relationship between the target effect style and the target video clip;
  a presenting module, configured to present, based on the binding relationship, the target video clip to which the target effect style is applied.

In an optional embodiment, the apparatus further includes:
  a second establishing module, configured to generate an effect track for the target video clip, and establish a binding relationship between the effect track and the target video clip, wherein a length of the effect track is used to represent a length of the target video clip to which the target effect style is applied;
  an updating module, configured to update, in response to a length adjustment operation with respect to the effect track, the length of the target video clip having the binding relationship with the effect track.

In an optional embodiment, the apparatus further includes:
  a releasing module, configured to release, in a case where a drag displacement with respect to the effect track reaches a preset threshold, the binding relationship between the effect track and the target video clip, and release the binding relationship between the target video clip and the target effect style.

In a third aspect, the present disclosure provides a computer-readable storage medium, wherein the computer-readable storage medium stores instructions, and the instructions, when run on a terminal device, enables the terminal device to implement the method described above.

In a fourth aspect, the present disclosure provides a device, the device includes a memory, a processor, and a computer program stored on the memory and runnable on the processor, in a case where the processor executes the computer program, the method described above is achieved.

Compared with the prior art, the technical scheme provided by the disclosed embodiment has the following advantages:

An embodiment of the present disclosure provides a video processing method in which, after determining a target effect style and determining a target video clip based on presentation of a video to be processed on a timeline, a binding relationship is established between the target effect style and the target video clip in response to an effect application trigger operation, so as to achieve an effect of applying the target effect style to the target video clip. By establishing the binding relationship between the target effect style and the target video clip, the embodiment of the present disclosure achieves an effect of effect processing only on a certain video clip, thereby meeting users' demands of effect processing only on a certain video clip, which increases flexibility of video effect processing, and further improves users' experience of video effect processing.

BRIEF DESCRIPTION OF THE DRAWINGS

In order to more clearly explain the technical scheme of the embodiments of the present disclosure, the following will briefly introduce the drawings of the embodiments. Obviously, the drawings in the following description only relate to some embodiments of the present disclosure, but are not restrictive to the present disclosure.

DETAILED DESCRIPTION

In order to be able to more clearly understand the above objects, features and advantages of the present disclosure, the scheme of the present disclosure will be further described below. It should be noted that the embodiments of the present disclosure and the features in the embodiments can be combined with each other without conflict.

Many specific details are set forth in the following description in order to fully understand the present disclosure, but the present disclosure can also be implemented in other ways different from those described here; Obviously, the embodiments in the specification are only part of the embodiments of this disclosure, but not all of them.

At present, when effect processing is performed on a video, the video may have only one certain video clip to which a certain effect is applicable, while the effect is not applicable to other video clips, so that a user needs to apply the effect processing only on a certain video clip in the video. If the current video processing method is used to rigidly apply the effect to all pictures of the whole video, the user's demand for video effect processing cannot be met, thereby reducing the user's experience of video effect processing.

On such basis, the present disclosure provides a more flexible method for video effect processing. In this method, after determining a target effect style and determining a target video clip based on presentation of a video to be processed on a timeline, a binding relationship is established between the target effect style and the target video clip in response to an effect application trigger operation, so as to achieve the effect of applying the target effect style to the target video clip.

It may be seen that by establishing the binding relationship between the target effect style and the target video clip, the embodiment of the present disclosure achieves the effect of effect processing only on a certain video clip of the video, thereby meeting the user's demand of effect processing only on a certain video clip, which increases flexibility of effect processing on the video, and further improves the user's experience of effect processing on the video.

Figure 1:
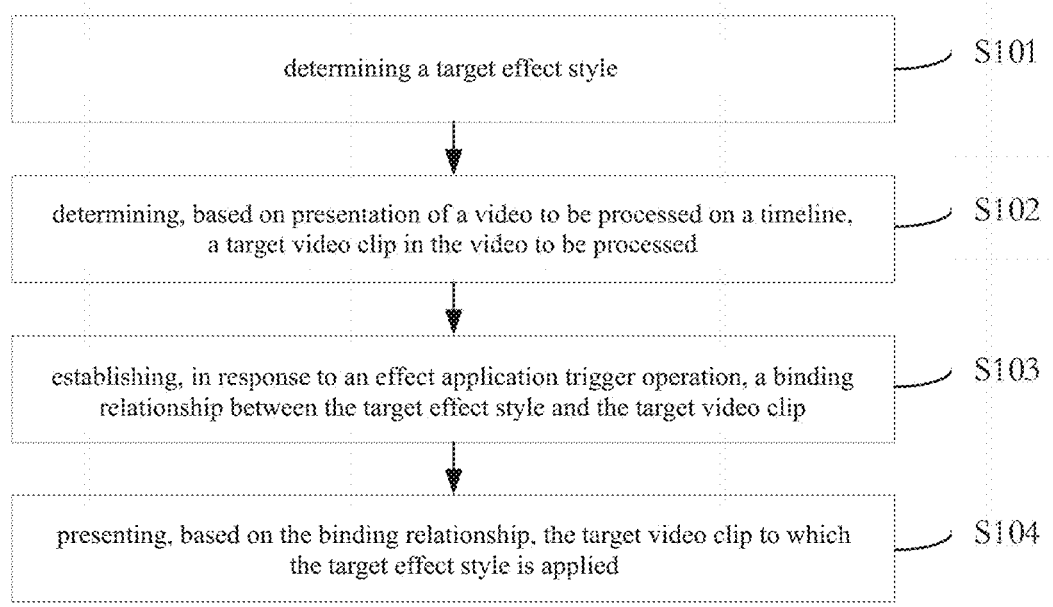
FIG. 1 is a flow chart of a video processing method provided by an embodiment of the present disclosure.

On such basis, an embodiment of the present disclosure provides a video processing method, referring to FIG. 1, FIG. 1 is a flow chart of a video processing method provided by the embodiment of the present disclosure. The method includes:

S101: determining a target effect style.

In the embodiment of the present disclosure, the target effect style may include a filter effect style, a special effect style, a sticker effect style, and the like.

In an optional embodiment, various effect styles may be presented on an interface, and a user clicks any effect style to achieve an effect of determining the effect style as the target effect style.

It should be noted that a mode of determining the target effect style will not be limited in the embodiment of the present disclosure.

S102: determining, based on presentation of a video to be processed on a timeline, a target video clip in the video to be processed.

Figure 2:
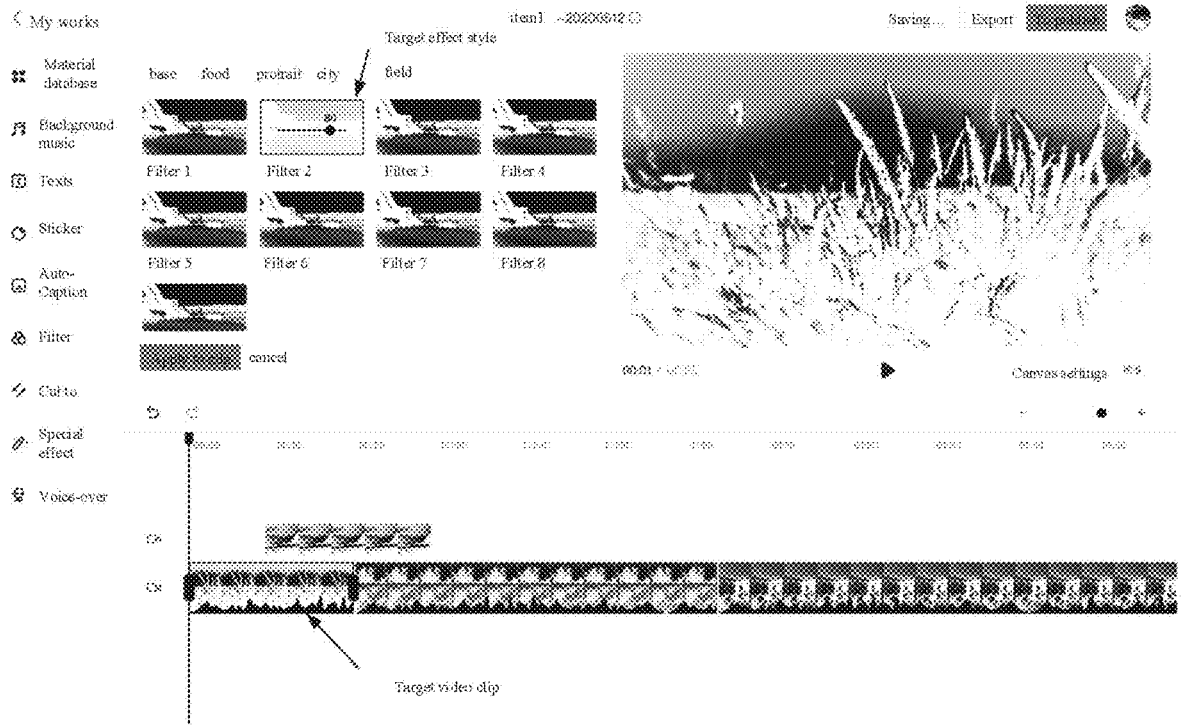
FIG. 2 is an effect diagram of a video processing interface provided by an embodiment of the present disclosure.

In the embodiment of the present disclosure, the video to be processed is presented based on the timeline, FIG. 2 is an effect diagram of a video processing interface provided by the embodiment of the present disclosure. As shown in FIG. 2, the video to be processed presents video pictures corresponding to respective time points on the timeline, and the user may determine a video clip in the video to be processed as the target video clip.

In an optional embodiment, by determining start time and end time of a video clip, a target video clip from a video picture corresponding to the start time to a video picture corresponding to the end time may be determined in the video to be processed.

In another optional embodiment, the target video clip may also be determined in the video to be processed by dragging the target effect style to a certain video clip in the video to be processed.

Other modes of determining the target video clip in the video to be processed re not limited in the embodiment of the present disclosure.

It should be noted that an order of executing the above-described S101 and S102 are not limited in the embodiment of the present disclosure.

S103: establishing, in response to an effect application trigger operation, a binding relationship between the target effect style and the target video clip.

In the embodiment of the present disclosure, after determining the target effect style and the target video clip, an operation of applying the target effect style to the target video clip may be triggered.

In practical application, when detecting the effect application trigger operation, the binding relationship between the target effect style and the target video clip corresponding to the effect application trigger operation may be established, so as to apply the target effect style to the target video clip.

In an optional embodiment, after determining the target effect style and the target video clip, the user may click an "Apply to clip" button as shown in FIG. 2 to establish the binding relationship between the target effect style and the target video clip corresponding to the effect application trigger operation, so as to achieve the effect of applying the target effect style to the target video clip.

In another optional embodiment, after determining the target effect style and target video clip, dragging the target effect style to the target video clip, so as to trigger the effect application trigger operation, and establishing the binding relationship between the target video clip and the target effect style corresponding to the effect application trigger operation. Specifically, a mouse release operation corresponding to the above-described dragging operation may not only trigger the determination of the target video clip, but also trigger establishment of the binding relationship between the target effect style and the target video clip, so as to achieve the effect of applying the target effect style to the target video clip.

S104: presenting, based on the binding relationship, the target video clip to which the target effect style is applied.

In the embodiment of the present disclosure, after establishing the binding relationship between the target effect style and the target video clip, the target video clip to which the target effect style is applied may be presented to the user on the interface based on the binding relationship.

In addition, in order to more flexibly implement effect processing on the video, in the embodiment of the present disclosure, the video clip on a certain video track of the video to be processed may be determined as the target video clip, so as to determine the target video clip to which the target effect style is applied in a more fine-grained manner, which improves flexibility of effect processing on the video.

In practical application, the video track usually includes a main track and a picture-in-picture track. In the embodiment of the present disclosure, the video clip of the video to be processed that is on the main track or the picture-in-picture track may be determined as the target video clip, so as to achieve the effect of applying the target effect style to the video clip on the main track or the picture-in-picture track.

In the video processing method provided by the embodiment of the present disclosure, after determining the target effect style and determining the target video clip based on presentation of the video to be processed on the timeline, establishing the binding relationship between the target effect style and the target video clip in response to the effect application trigger operation, so as to achieve the effect of applying the target effect style to the target video clip. By establishing the binding relationship between the target effect style and the target video clip, the effect of effect processing only on a certain video clip may be achieved, thereby meeting the user's demand of effect processing only on a certain video clip, which increases flexibility of effect processing on the video, and further improves the user's experience of effect processing on the video.

Figure 3:
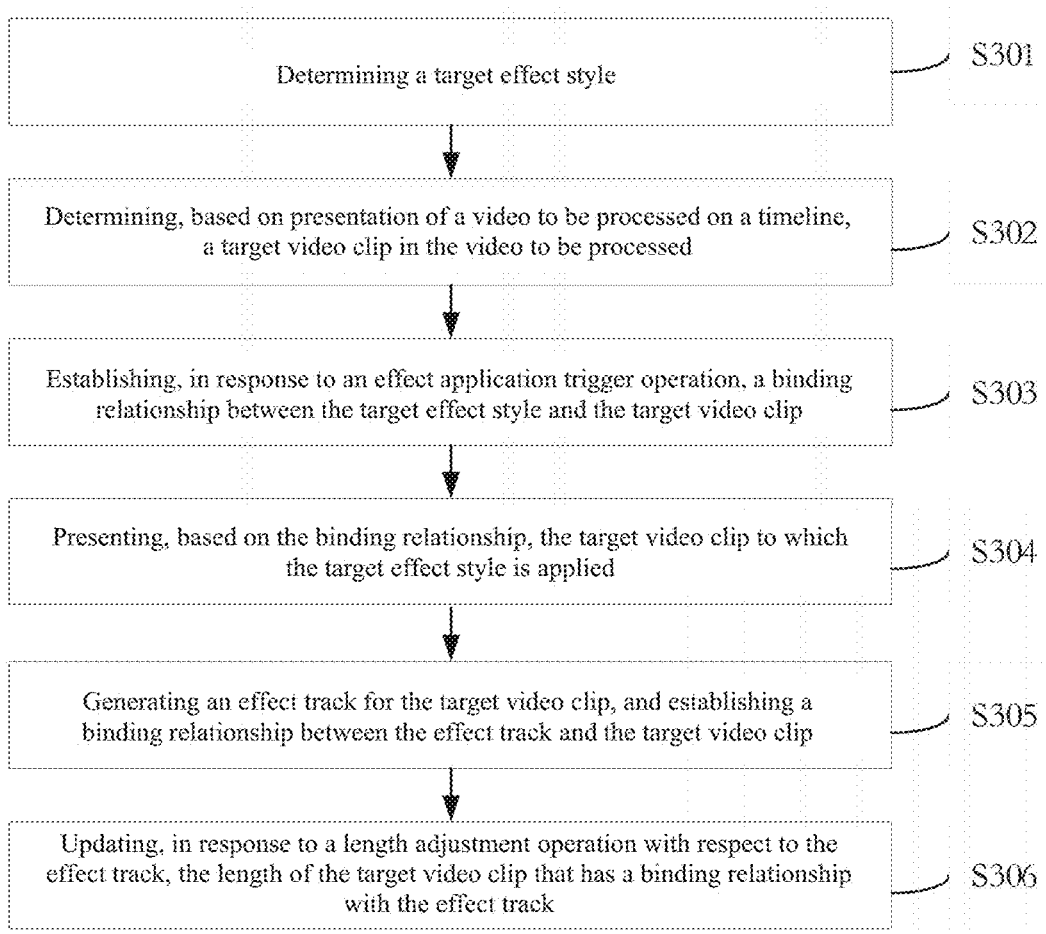
FIG. 3 is a flow chart of another video processing method provided by an embodiment of the present disclosure.

In order to further improve flexibility of video processing and enrich functions of video processing, an embodiment of the present disclosure further provides a video processing method. FIG. 3 is a flow chart of another video processing method provided by the embodiment of the present disclosure. Referring to FIG. 3, the method includes:

S301: determining a target effect style.

S302: determining, based on presentation of a video to be processed on a timeline, a target video clip in the video to be processed.

S303: establishing, in response to an effect application trigger operation, a binding relationship between the target effect style and the target video clip.

S304: presenting, based on the binding relationship, the target video clip to which the target effect style is applied.

S301 to S304 according to the embodiment of the present disclosure may be understood with reference to the description of S101 to S104 according to the above-described embodiment, and no details will be repeated here.

S305: generating an effect track for the target video clip, and establishing a binding relationship between the effect track and the target video clip.

A length of the effect track is used to represent a length of the target video clip to which the target effect style is applied.

Figure 4:
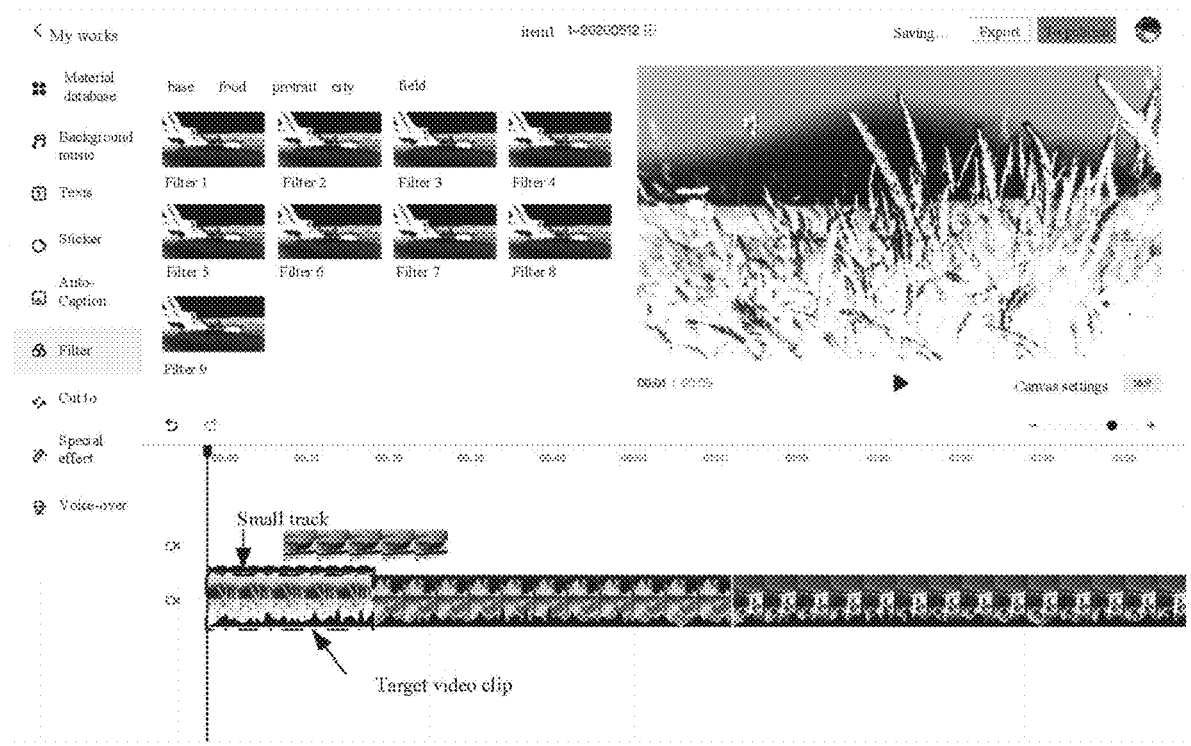
FIG. 4 is an effect diagram of another video processing interface provided by an embodiment of the present disclosure.
Figure 5:
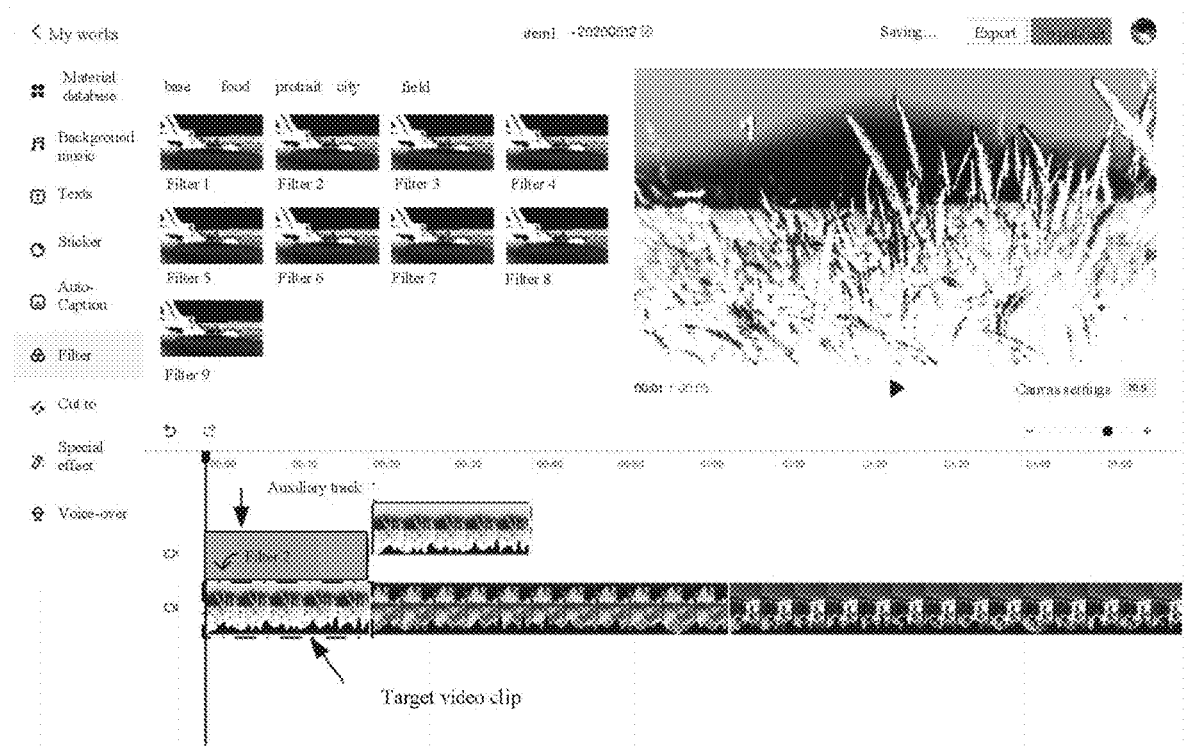
FIG. 5 is an effect diagram of still another video processing interface provided by an embodiment of the present disclosure.
Figure 6:
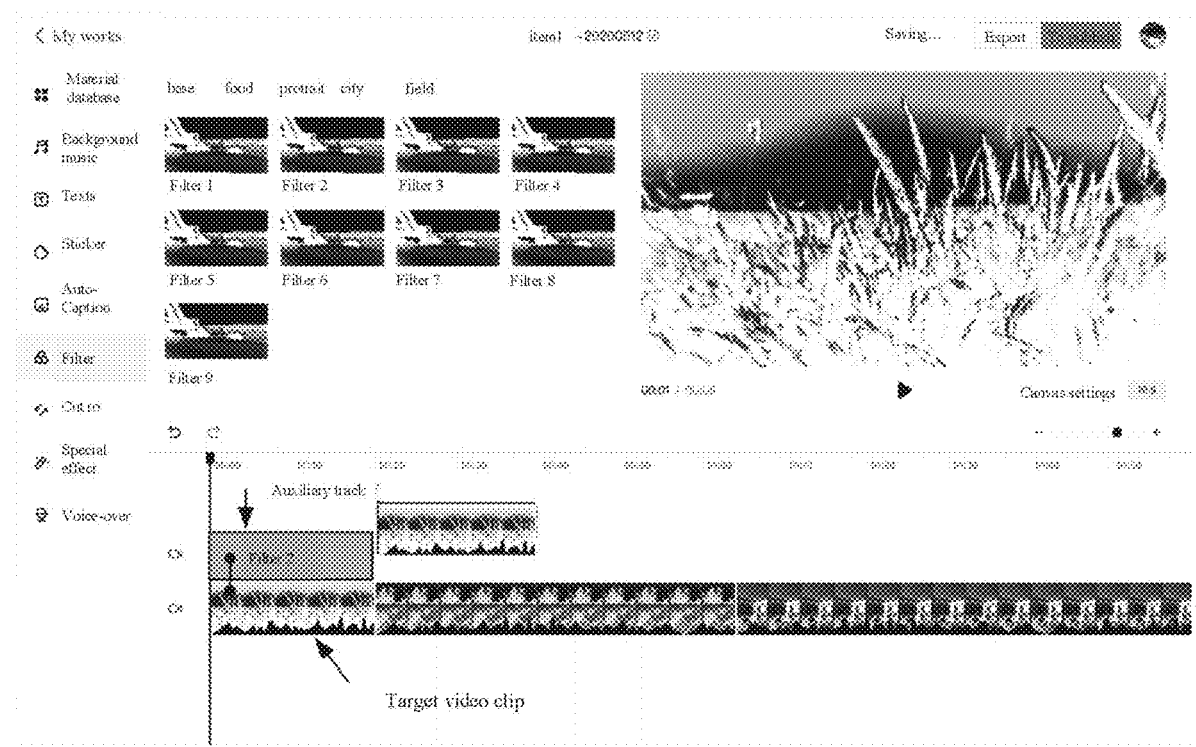
FIG. 6 is an effect diagram of still another video processing interface provided by an embodiment of the present disclosure.

In the embodiment of the present disclosure, when detecting the effect application trigger operation, not only establishing the binding relationship between the target effect style and the target video clip, but also generating the effect track for the target video clip. FIG. 4, FIG. 5 and FIG. 6 are respectively effect diagrams of the video processing interface provided by the embodiments of the present disclosure. As shown in FIG. 4, FIG. 5 and FIG. 6, the effect track is presented above the target video clip, and the effect tracks have different styles. The effect track in FIG. 4 may be referred to as a small track (the small track is shown in a black region defined by a dotted line box in FIG. 4, and the target video clip is shown in a region defined by a dotted dash line box in FIG. 4), the effect tracks in FIG. 5 and FIG. 6 may be referred to as auxiliary tracks (as shown in gray regions defined by black solid line boxes in FIG. 5 and FIG. 6, and the target video clips are respectively regions defined by black dotted line boxes in FIG. 5 and FIG. 6).

Figure 7:
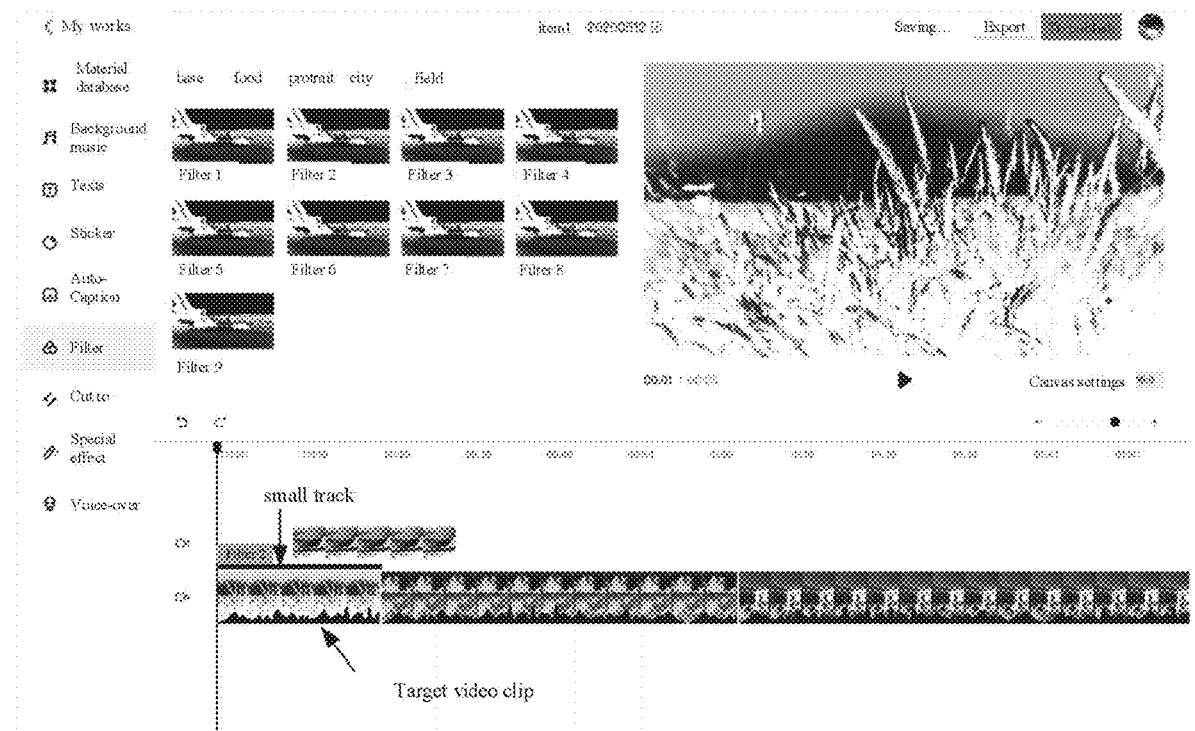
FIG. 7 is an effect diagram of still another video processing interface provided by an embodiment of the present disclosure.
Figures 8, 9:
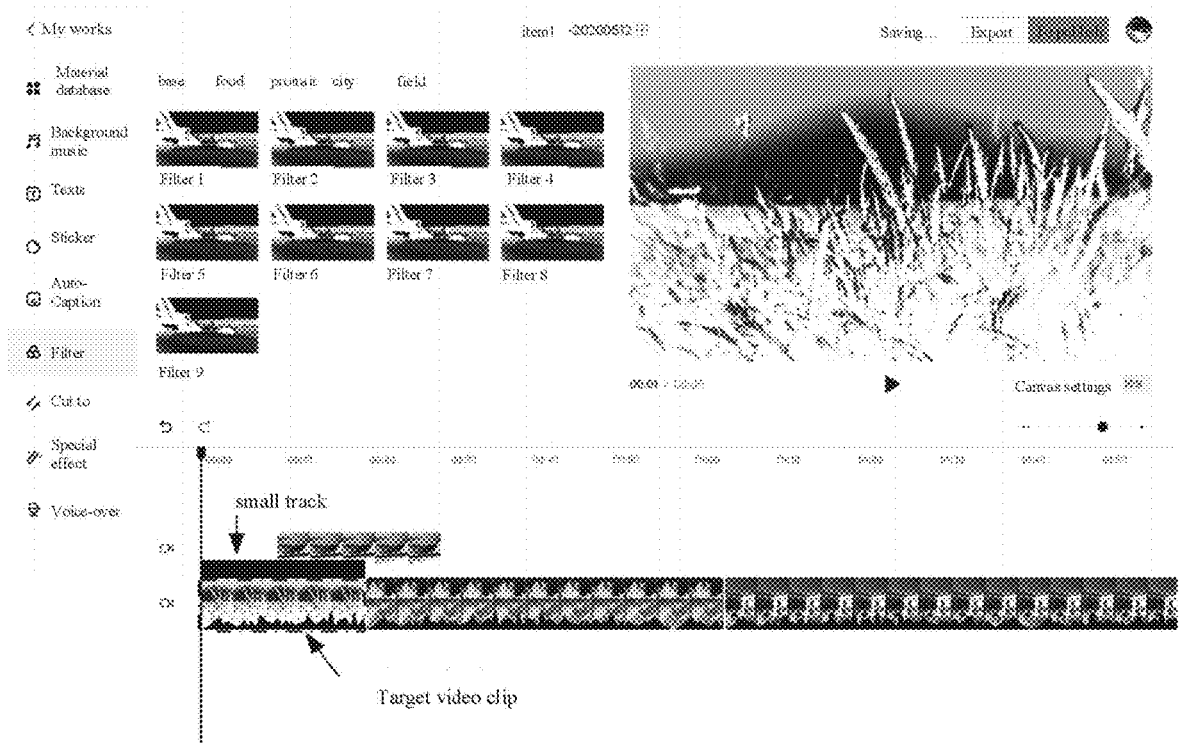
FIG. 8 is an effect diagram of still another video processing interface provided by an embodiment of the present disclosure.
FIG. 9 is an effect diagram of still another video processing interface provided by an embodiment of the present disclosure.

In an optional embodiment, a name of the target effect style may be displayed in a form of a track label above the small track shown in FIG. 4; as shown in FIG. 7 (FIG. 7 is an effect diagram of a video processing interface provided by the embodiment of the present disclosure), a name "Filter 2" of the target effect style is displayed in a form of a track label above the small track of the target video clip. Specifically, when the user hovers the mouse over the small track, the expansion of the track label may be triggered to present contents in the track label for the user, and then when the user clicks the track label again, further expansion of the small track may be triggered. As shown in FIG. 8, it is an effect diagram of another video processing interface provided by the embodiment of the present disclosure, in which the small track on the target video clip (as shown by the black region indicated by the arrow in FIG. 8) is a small track style expanded after clicking the track label in FIG. 7.

In practical application, after generating the effect track for the target video clip, establishing the binding relationship between the effect track and the target video clip. The length of the effect track is used to represent the length of the target video clip to which the target effect style is applied.

In the embodiment of the present disclosure, by executing an interactive operation on the effect track that has a binding relationship with the target video clip, an interactive operation on the target video clip may be implemented, and an interactive operation on the target effect style that has a binding relationship with the target video clip may be implemented.

In an optional embodiment, a drag operation may be executed on the effect track, to trigger releasing the binding relationship between the effect track and the target video clip, and releasing the binding relationship between the target video clip and the target effect style. Specifically, when detecting that drag displacement with respect to the effect track reaches a preset threshold, releasing the binding relationship between the effect track and the target video clip, and releasing the binding relationship between the target video clip and the target effect style. FIG. 9 is an effect diagram of another video processing interface provided by the embodiment of the present disclosure. As shown in FIG. 9, taking the auxiliary track in FIG. 6 as an example, when the "auxiliary track" in FIG. 6 is dragged and stretched to a critical point to be disconnected, for example, when the auxiliary track in FIG. 6 is dragged to the right to a position shown in FIG. 9 and disconnected, it triggers releasing the binding relationship between the effect track and the target video clip, and releasing the binding relationship between the target video clip and the target effect style.

In practical application, after releasing the above-described binding relationship, the target effect style will no longer be applied to the target video clip, but will trigger an operation of applying the target effect style to all pictures of the video to be processed. At this time, the effect track may be a video track of the video to be processed.

In another optional embodiment, in order to improve user experience of video editing, when detecting a move operation with respect to the target video clip, the effect track and target effect style that have binding relationships with the target video clip may be controlled to move with the target video clip.

Figure 10:
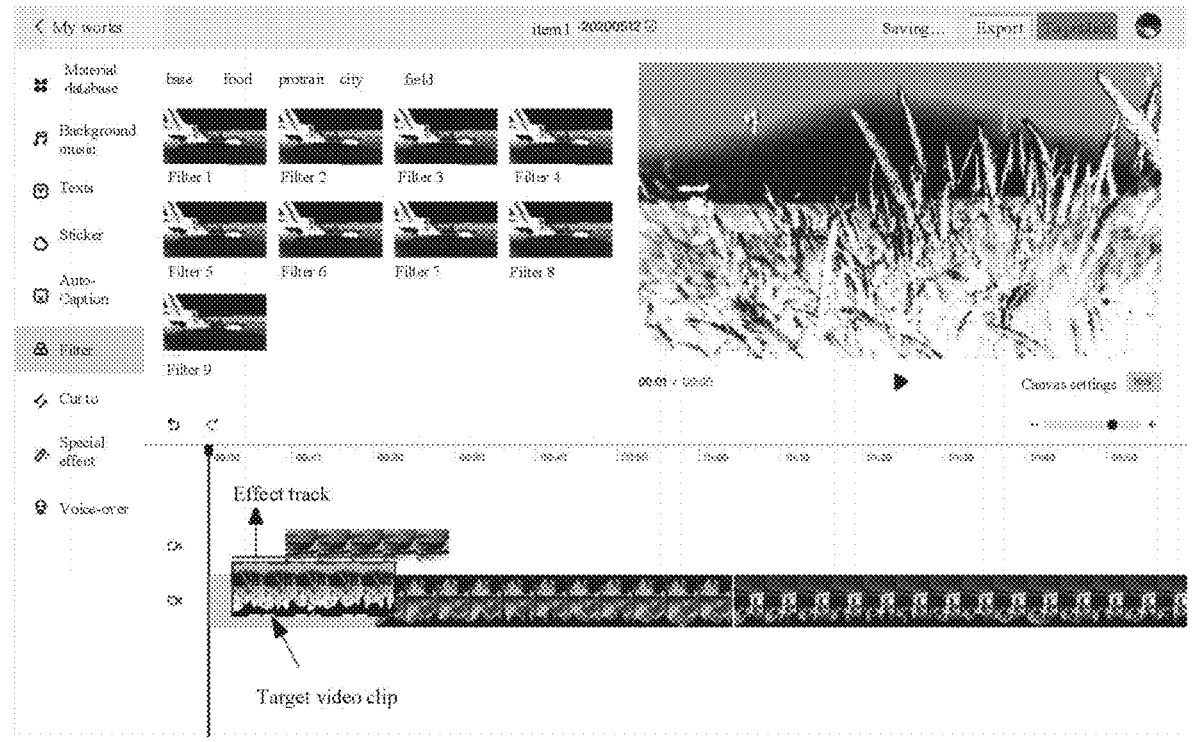
FIG. 10 is an effect diagram of still another video processing interface provided by an embodiment of the present disclosure.

FIG. 10 is an effect diagram of another video processing interface provided by an embodiment of the present disclosure. As shown in FIG. 10, taking the small track in FIG. 4 as an example, when detecting a move operation with respect to the target video clip, the effect track (a long bar marked as the effect track on an upper side of FIG. 10) and the target effect style that have binding relationships with the target video clip (as shown in a dotted line box in FIG. 10) is controlled to move with the target video clip.

S306: updating, in response to a length adjustment operation with respect to the effect track, the length of the target video clip that has a binding relationship with the effect track.

In the embodiment of the present disclosure, because the length of the effect track is used to represent the length of the target video clip to which the target effect style is applied, the length of the target video clip that has a binding relationship with the effect track may be updated by adjusting the length of the effect track.

In practical application, the user may perform a length adjustment operation on the effect track, for example, a lengthen operation or shorten operation with respect to the effect track, so as to achieve length adjustment with respect to the target video clip that has a binding relationship with the effect track, and update the length of the video clip to which the target effect style is applied.

The video processing method provided by the embodiment of the present disclosure, by establishing the binding relationship between the target effect style and the target video clip, the effect of effect processing only on a certain video clip of the video may be achieved, thereby meeting the user's demand of effect processing only on a certain video clip, which increases flexibility of video effect processing, and further improves the user's experience of video effect processing.

In addition, the effect track is generated for the target video clip, which further improves flexibility of video processing, enriches the video processing functions, and further improves the user's experience of video effect processing.

Figure 11:
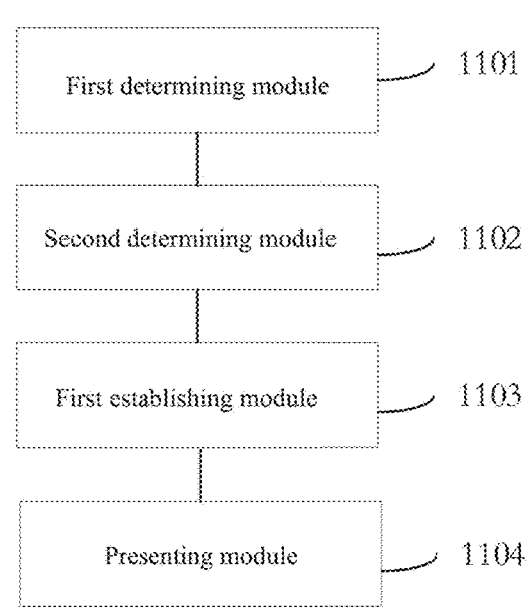
FIG. 11 is a structural block diagram of a video processing apparatus provided by an embodiment of the present disclosure.

With a same inventive concept as the above-described method embodiment, an embodiment of the present disclosure further provides a video processing apparatus. FIG. 11 is a structural schematic diagram of a video processing apparatus provided by the embodiment of the present disclosure. referring to FIG. 11, the apparatus includes:
- a first determining module 1101, configured to determine a target effect style;
- a second determining module 1102, configured to determine, based on presentation of a video to be processed on a timeline, a target video clip in the video to be processed;
- a first establishing module 1103, configured to establish, in response to an effect application trigger operation, a binding relationship between the target effect style and the target video clip;
- a presenting module 1104, configured to present, based on the binding relationship, the target video clip to which the target effect style is applied.

In an optional embodiment, the apparatus further includes:
- a second establishing module, configured to generate an effect track for the target video clip, and establish a binding relationship between the effect track and the target video clip; a length of the effect track is used to represent a length of the target video clip to which the target effect style is applied;
- an updating module, configured to update, in response to a length adjustment operation with respect to the effect track, the length of the target video clip having the binding relationship with the effect track.

In an optional embodiment, the apparatus further includes:
- a releasing module, configured to release, in a case where a drag displacement with respect to the effect track reaches a preset threshold, the binding relationship between the effect track and the target video clip, and release the binding relationship between the target video clip and the target effect style.

In an optional embodiment, the apparatus further includes:
- a control module, configured to control, in response to a move operation with respect to the target video clip, the effect track having the binding relationship with the target video clip and the target effect style having the binding relationship with the target video clip to move with the target video clip.

In an optional embodiment, the target video clip is located on a main track or a picture-in-picture track of the video to be processed.

The video processing apparatus provided by the embodiment of the present disclosure, after determining a target effect style and determining a target video clip based on presentation of a video to be processed on a timeline, establishes a binding relationship between the target effect style and the target video clip in response to an effect application trigger operation, so as to achieve an effect of applying the target effect style to the target video clip. The embodiment of the present disclosure, by establishing the binding relationship between the target effect style and the target video clip, achieves the effect of effect processing only on a certain video clip of the video, thereby meeting the user's demand of effect processing only on a certain video clip, which increases flexibility of video effect processing, and further improves the user's experience of video effect processing.

Figure 12:
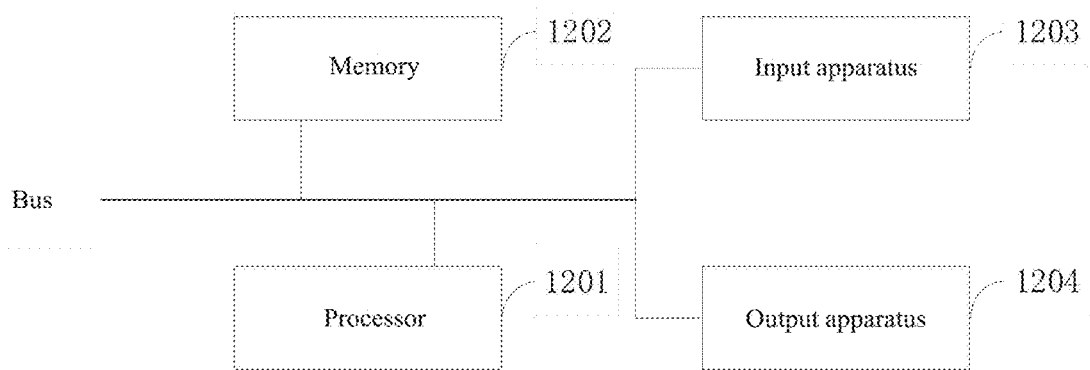
FIG. 12 is a structural block diagram of a video processing device provided by an embodiment of the present disclosure.

In addition, an embodiment of the present disclosure further provides a video processing device. As shown in FIG. 12, the video processing device may include:

a processor 1201, a memory 1202, an input apparatus 1203, and an output apparatus 1204. The number of processors 1201 in the video processing device may be one or more, taking one processor as an example in FIG. 12. In some embodiments of the present disclosure, the processor 1201, the memory 1202, the input apparatus 1203 and the output apparatus 1204 may be connected by a bus or other means, taking connection by a bus as an example in FIG. 12.

The memory 1202 may be configured to store software program and module; and the processor 1201 may execute various functional applications and data processing of the video processing device by running the software program and the module stored in the memory 1202. The memory 1202 may mainly include a program storage region and a data storage region, the program storage region may store an operating system, an application required for at least one function, etc. In addition, the memory 1202 may include a high-speed random access memory, and may also include a nonvolatile memory, for example, at least one disk storage device, a flash memory, or other volatile solid-state storage device. The input apparatus 1203 may be configured to receive input digital or character information and generate signal inputs related to user setting and function control of the video processing device.

Specifically, in this embodiment, the processor 1201 will load executable files corresponding to the processes of one or more applications into the memory 1202 according to instructions below, and the processor 1201 may run the applications stored in the memory 1202, thereby implementing various functions of the video processing device as described above.

It should be noted that in this specification, relational terms such as "first" and "second" are only used to distinguish one entity or operation from another entity or operation, without necessarily requiring or implying any such actual relationship or sequence between these entities or operations. Moreover, the term "include", "comprise" or any other variation thereof is intended to cover non-exclusive inclusion, so that a process, method, article or equipment that includes a series of elements not only includes those elements, but also includes other elements not explicitly listed, or also includes elements inherent to such process, method, article or equipment. Without further restrictions, the element defined by the statement "including one . . . " does not exclude the existence of another identical element in the process, method, article or equipment that includes the said element.

The above are only specific embodiments of the present disclosure to enable those skilled in the art to understand or realize the present disclosure. Many modifications to these embodiments will be obvious to those skilled in the art, and the general principles defined herein can be implemented in other embodiments without departing from the spirit or scope of this disclosure. Therefore, the present disclosure will not be limited to the embodiments described herein but will be accorded the widest scope consistent with the principles and novel features disclosed herein.

What is claimed is:

1. A video processing method, comprising:
   determining a target effect style;
   determining, based on presentation of a video to be processed on a timeline, a target video clip in the video to be processed;
   in response to an effect application trigger operation, establishing a binding relationship between the target effect style and the target video clip, so as to apply the target effect style to the target video clip;
   generating an effect track for the target video clip, and establishing a binding relationship between the effect track and the target video clip, wherein a length of the effect track is used to represent a length of the target video clip to which the target effect style is applied;
   updating, in response to a length adjustment operation with respect to the effect track, the length of the target video clip having the binding relationship with the effect track; and
   based on the binding relationship, presenting the target video clip to which the target effect style is applied.

2. The method according to claim 1, further comprising:
   in a case where a drag displacement with respect to the effect track reaches a preset threshold, releasing the binding relationship between the effect track and the target video clip, and releasing the binding relationship between the target video clip and the target effect style.

3. The method according to claim 2, further comprising:
   controlling, in response to a move operation with respect to the target video clip, the effect track having the binding relationship with the target video clip and the target effect style having the binding relationship with the target video clip to move with the target video clip.

4. A device, comprising a memory, a processor, and a computer program stored on the memory and runnable on the processor,
   wherein, in a case where the processor executes the computer program, the method according to claim 2 is achieved.

5. The method according to claim 1, further comprising:
   controlling, in response to a move operation with respect to the target video clip, the effect track having the binding relationship with the target video clip and the target effect style having the binding relationship with the target video clip to move with the target video clip.

6. The method according to claim 1, wherein the target video clip is located on a main track or a picture-in-picture track of the video to be processed.

7. A device, comprising a memory, a processor, and a computer program stored on the memory and runnable on the processor, wherein, in a case where the processor executes the computer program, the method according to claim 1 is achieved.

8. A video processing apparatus, comprising:
a first determining module, configured to determine a target effect style;
a second determining module, configured to determine, based on presentation of a video to be processed on a timeline, a target video clip in the video to be processed;
a first establishing module, configured to establish, in response to an effect application trigger operation, a binding relationship between the target effect style and the target video clip, so as to apply the target effect style to the target video clip;
a second establishing module, configured to generate an effect track for the target video clip, and establish a binding relationship between the effect track and the target video clip, wherein a length of the effect track is used to represent a length of the target video clip to which the target effect style is applied;
an updating module, configured to update, in response to a length adjustment operation with respect to the effect track, the length of the target video clip having the binding relationship with the effect track; and
a presenting module, configured to present, based on the binding relationship, the target video clip to which the target effect style is applied.

9. The apparatus according to claim 8, further comprising:
a releasing module, configured to release, in a case where a drag displacement with respect to the effect track reaches a preset threshold, the binding relationship between the effect track and the target video clip, and release the binding relationship between the target video clip and the target effect style.

10. The apparatus according to claim 9, further comprising:
a control module, configured to control, in response to a move operation with respect to the target video clip, the effect track having the binding relationship with the target video clip and the target effect style having the binding relationship with the target video clip to move with the target video clip.

11. The apparatus according to claim 8, further comprising:
a control module, configured to control, in response to a move operation with respect to the target video clip, the effect track having the binding relationship with the target video clip and the target effect style having the binding relationship with the target video clip to move with the target video clip.

12. The apparatus according to claim 8, wherein the target video clip is located on a main track or a picture-in-picture track of the video to be processed.

13. A non-transitory computer-readable storage medium, wherein the computer-readable storage medium stores instructions, and the instructions, when run on a terminal device, enables the terminal device to implement a video processing method,
wherein the video processing method comprises:
determining a target effect style;
determining, based on presentation of a video to be processed on a timeline, a target video clip in the video to be processed;
in response to an effect application trigger operation, establishing a binding relationship between the target effect style and the target video clip, so as to apply the target effect style to the target video clip;
generating an effect track for the target video clip, and establishing a binding relationship between the effect track and the target video clip, wherein a length of the effect track is used to represent a length of the target video clip to which the target effect style is applied;
updating, in response to a length adjustment operation with respect to the effect track, the length of the target video clip having the binding relationship with the effect track; and
based on the binding relationship, presenting the target video clip to which the target effect style is applied.

14. The non-transitory computer-readable storage medium according to claim 13, wherein the video processing method further comprises:
in a case where a drag displacement with respect to the effect track reaches a preset threshold, releasing the binding relationship between the effect track and the target video clip, and releasing the binding relationship between the target video clip and the target effect style.

* * * * *